United States Patent [19]

Sakai

[11] Patent Number: 4,680,692
[45] Date of Patent: Jul. 14, 1987

[54] CONTROL APPARATUS OF AC/DC POWER CONVERTER

[75] Inventor: Takami Sakai, Tokyo, Japan

[73] Assignee: Kabushiki Kaisha Toshiba, Kawasaki, Japan

[21] Appl. No.: 808,047

[22] Filed: Dec. 12, 1985

[30] Foreign Application Priority Data

Dec. 28, 1984 [JP]  Japan .................................. 59-276119

[51] Int. Cl.$^4$ .............................................. H02J 3/36
[52] U.S. Cl. ...................................... 363/35; 363/37; 363/51; 363/52; 363/55
[58] Field of Search ....................... 363/34, 35, 37, 51, 363/52, 55

[56] References Cited

U.S. PATENT DOCUMENTS 4,475,150 10/1984 D'Atre et al. ......................... 363/51

Primary Examiner—Patrick R. Salce
Assistant Examiner—Anita M. Ault
Attorney, Agent, or Firm—Oblon, Fisher, Spivak, McClelland & Maier

[57] ABSTRACT

In the control apparatus of an AC/DC power converter, the occurrence of a single-phase line-open in the AC power line is detected by an open-circuit detector so that a detection signal is generated. The control angle of a converter on the side of occurrence of the single-phase line-open is kept at a given value based on the detection signal. At the same time, the current set value of the automatic current regulator is also kept at a fixed value based on the detection signal.

14 Claims, 3 Drawing Figures

CONTROL APPARATUS OF AC/DC POWER CONVERTER

BACKGROUND OF THE INVENTION

The present invention relates to a control apparatus of an AC/DC power converter, which is responsive to occurrence of a single-phase open fault in the power line of an AC system connected to the AC/DC power converter.

FIG. 1 schematically shows a typical AC/DC power transmission system. AC power lines 1 and 1' are coupled via transformers 2 and 2' to converters 3 and 3', respectively. Each of converters 3 and 3' may be formed of a plurality of thyristors connected to a series-parallel fashion. Power conversion from AC to DC or vice versa is carried out by controlling the turn-on phase of each thyristor. In the system of FIG. 1, smoothing reactors 4 and 4', DC power transmission line 5, potential transformers 6 and 6' and current transformers 7 and 7' are further provided. This system also includes a control unit which is formed of automatic current regulators 8 and 8' and automatic margin angle controllers 9 and 9'. This control unit may further include automatic voltage regulators for keeping the DC voltage at a constant value.

The signal values obtained from automatic current regulator 8 or 8' and from automatic margin angle controller 9 or 9' are fed as control voltages to minimim value selector 10 or 10'. Minimum value selector 10 or 10' automatically selects one of the control voltages which serves to advance the control angle to the greatest extent. The selected control voltage from minimum value selector 10 or 10' is fed to control voltage limiter 11 or 11'. This limiter is provided for limiting the peak potential of a control signal input to phase control circuit 12 or 12'. Phase control circuit 12 or 12' supplies turn-on pulses to converter 3 or 3', so that each turn-on phase of the thyristors is determined in accordance with the control signal input to circuit 12 or 12'.

In the above AC/DC power converter configuration, as is well known in the art, one (3) of the two converters is operated as a rectifier with automatic current regulation while the other (3') is operated as an inverter with automatic margin angle control, according to the proper change of current margin ΔI.

In the following description, for the sake of simplicity, converters 3 and 3' are referred to as rectifier and inverter, respectively.

It is now assumed that a single-phase ground fault has occured in a power line of the AC system connected to AC power line 1'. At this time, an AC power line protection unit (not shown) functions to open breakers (not shown) connected to the faulted power line (1'). Thus, a single-phase line open occurs at the faulted power line. Then, the protection unit closes the breaker after the elapse of a predetermined period of time, so called a deionization interval. This is known as single-phase reclosing.

If the operation of the AC/DC converter is continued in the single-phase line-open condition, a large overvoltage occurs at the opened power line (1'). This overvoltage is liable to damage converters 3 and 3' and/or AC filters (not shown). The influence of such overvoltage is particularly pronounced when a weak AC power system is connected to the AC/DC power converter. This is chiefly because an AC impedance seen from the AC/DC converter side is greatly increased when the single-phase line open occurs.

When the single-phase line open occurs on the side of inverter 3' and particularly when a large prefault transmission power is high, a commutation failure of the thyristors is caused. Such a commutation failure serves as an additional disturbance that adversely affects the AC power system, resulting in the occurrence of AC and DC interaction. In short, this disturbance repeatedly causes continuous commutation failures.

When the single-phase line open occurs on the side of rectifier 3 and particularly when the prefault transmission power is low, the DC current flowing through DC line 5 is intermitted. This current intermittence also serves as an additional disturbance that adversely affects the AC power system, resulting in the occurrence of AC and DC interaction. Such a disturbance will induce unfavorable subsequent DC current intermittence. During the transient period of the current intermittence, there is a certain tendency for the automatic current regulation and automatic margin angle control to interfere with each other to promote so called "hunting".

The unfavorable phenomena noted above are common in simulation tests. In addition, overvoltage generation is described in a recently announced treatise (Cigre, International Conference on Large High Voltage Electronic Systems, 1984 Session).

SUMMARY OF THE INVENTION

It is, accordingly, an object of the present invention to provide a control apparatus of an AC/DC power converter, which, upon the occurence of a single-phase line-open in the power line of an AC power system, effects suppression of overvoltage at the power line and permits continued stable operation of the power system.

To achieve the above object, in the control apparatus of this invention, the occurrence of the single-phase line-open is detected and a detection signal is generated. The control angle of the converter on the side of the occurrence of the single-phase line-open is kept at a given value based on the detection signal. At the same time, the current set value of the automatic current regulator is also kept at a fixed value based on the detection signal.

DETAILED DESCRIPTION OF THE PREFERRED EMBODIMENT

Figure 3:
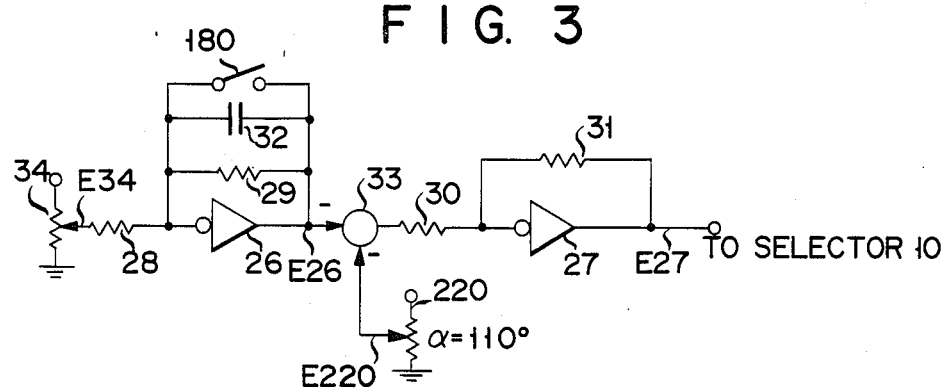
FIG. 3 is a partial circuit diagram which modifies the embodiment of FIG. 2.

In the following description it should be noted that the same elements or components are denoted by the same reference numerals or symbols among all figures, thereby avoiding redundant explanations.

Figure 1:
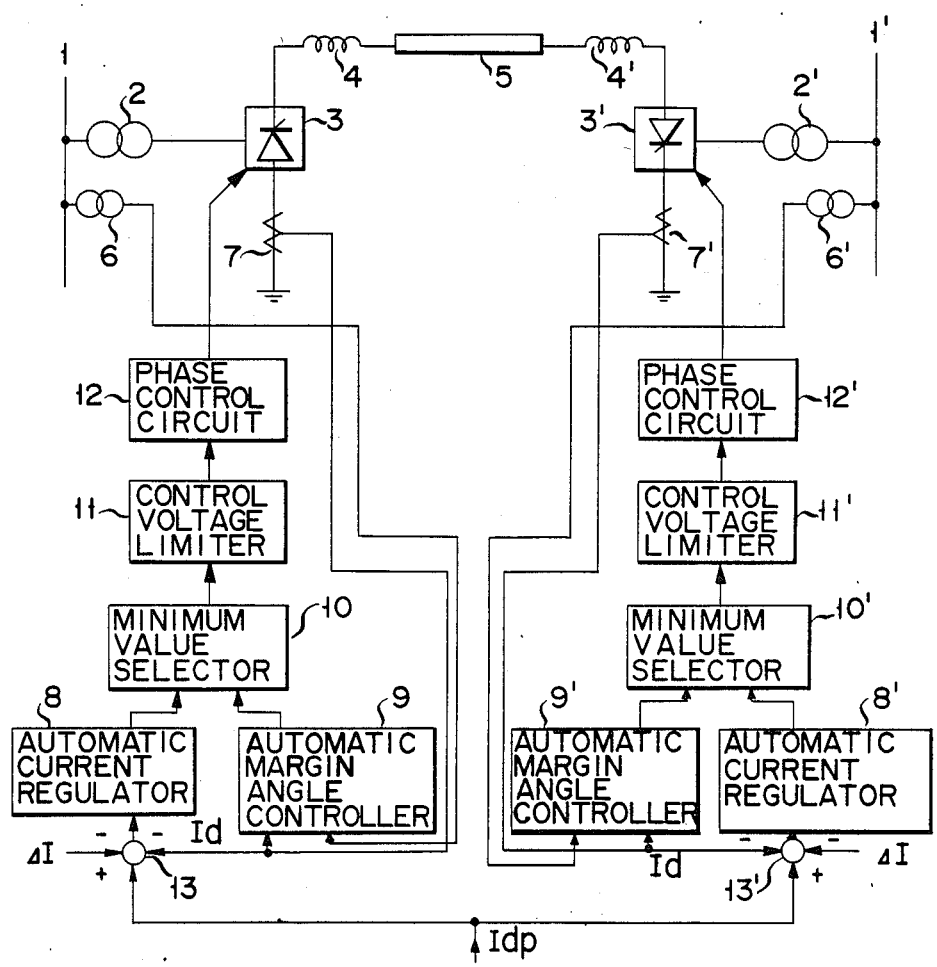
FIG. 1 is a schematic representation of a typical AC/DC power transmission system.
Figure 2:
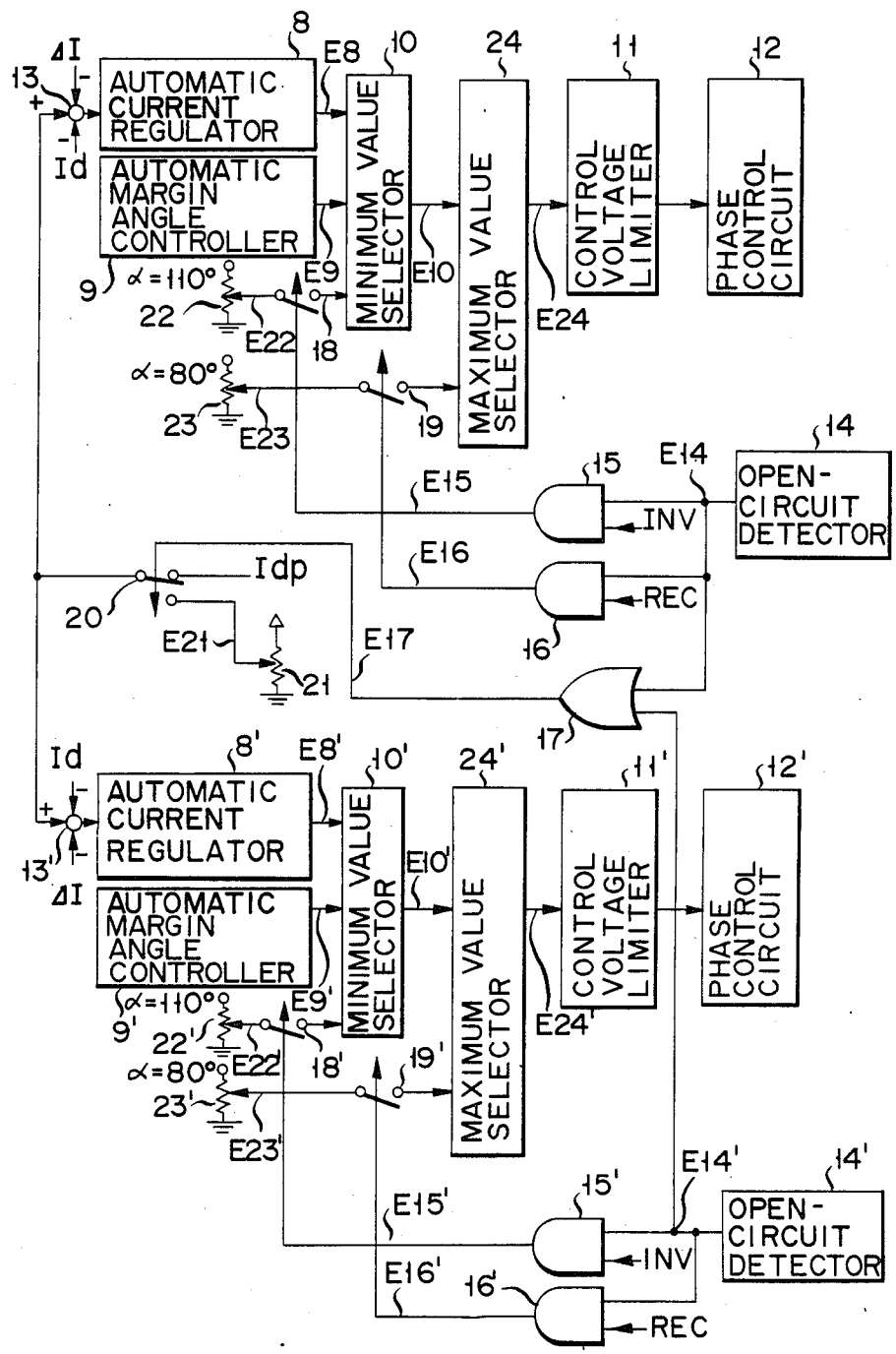
FIG. 2 is a schematic representation of an embodiment of the present invention.

FIG. 2 shows a block diagram of the converter control apparatus according to an embodiment of the present invention, which is adapted to the AC/DC power transmission system of FIG. 1. Hereinafter, for the sake of simplicity, converter 3 is referred to as a rectifier, and converter 3' as an inverter. Also, it is assumed that the operation of rectifier 3 is indicated by the logic level "1" of signal REC, and the operation of inverter 3' is indicated by logic level "1" of signal INV.

Open-circuit detectors 14 and 14' (FIG. 2) are provided for detecting the open-circuit of AC power lines 1 and 1' (FIG. 1). Detectors 14 and 14' are responsive to fault indicating signals from conventional AC power line protective relays (not shown). These protective relays are respectively coupled to AC power lines 1 and 1'. When a fault indicating signal is generated at a remote location but it cannot be transferred to detector 14 or 14' at a high speed, a known negative sequence voltage detection method may be applied to detector 14 or 14'.

When an open-circuit of AC power line 1 is detected by detector 14 in accordance with the fault indicating signal, detector 14 outputs detection signal E14. Similarly, when an open-circuit of AC power line 1' is detected by detector 14' in accordance with the other fault indicating signal, detector 14' outputs detection signal E14'. Signal E14 is input to AND gates 15 and 16 as well as to OR gate 17. Also, signal E14' is input to AND gates 15' and 16' and to OR gate 17. Each of AND gates 15 and 15' receives signal IV whose logic level "1" indicates the inverter operation. Each of AND gates 16 and 16' receives signal REC whose logic level "1" indicates the rectifier operation.

AND output E15 or E15' with logic level "1" from gate 15 or 15' serves to turn on switch 18 or 18'. When switch 18 or 18' is turned on, control voltage E22 or E22' delivered from control angle setter 22 or 22', each indicating control delay angle $\alpha = 110$ degrees, is supplied to minimum value selector 10 or 10'. AND output E16 or E16' with logic level "1" from gate 16 or 16' serves to turn on switch 19 or 19'. When switch 19 or 19' is turned on, control voltage E23 or E23' delivered from control angle setter 23 or 23', each indicating control delay angle $\alpha = 80$ degrees, is supplied to maximum value selector 24 or 24'.

When open-circuit detector 14 operates to detect the open-circuit of AC power line 1, it generates detection signal E14 with logic level "1". At this time, since converter (rectifier) 3 is assumed to provide signal REC, AND gate 16 provides signal E16 with logic level "1" to turn on switch 19. In this case, the logic level of signal IV is "0", so that AND gate 15 provides signal E15 with logic level "0" to turn off switch 18. (Switches 18' and 19' are both turned off when E14' = "0".)

On the other hand, when detector 14 or 14' detects the open-circuit of AC power line 1 or 1' based on said fault indicating signal, the logic level of OR output E17 from gate 17, which represents either detection signal E14 or E14', becomes "1". This logic "1" output E17 changes the selection state of switch 20, so that switch 20 selects prescribed current set value E21 delivered from setter 21.

The operation of the embodiment shown in FIG. 2 will now be described. First, a case wherein open-circuit detector 14 detects the single-phase open fault is considered. In this case, switch 19 is turned on and switch 20 is switched so that current set value E21 is selected. When switch 19 is turned on, control voltage E23 representing $\alpha = 80$ degrees is fed to maximum value selector 24. Here, it is assumed that current set value E21 corresponds to 0.3 pu (per unit) which indicates 30% of the rated DC current.

Before switch 19 is turned on, converter 3 is operated in a rectifier mode with control delay angle $\alpha$ generally from 20 to 40 degrees. This angle $\alpha$ is represented by control voltage E8 supplied from automatic current regulator 8 to minimum value selector 10. When this angle $\alpha$ is assumed to be 20 degrees, selector 10 outputs control voltage E10 corresponding to E8 ($\alpha = 20$ degrees). Under this condition, when switch 19 is turned on, control voltage E23 from setter 23, which corresponds to $\alpha = 80$ degrees, is selected as control signal E24 by maximum value selector 24.

When converter 3 starts to operate as a rectifier with fixed control delay angle of $\alpha = 80$ degrees, rectifier 3 can no longer provide a DC current corresponding to current set value E21. At this time, automatic current regulator 8' of converter (inverter) 3' operates to automatically provide a DC current corresponding to the difference between current margin $\Delta I$ and current set value E21. More specifically, since current set value E21 from setter 21 is assumed to be 0.3 pu, a DC current, which is basically equal to the difference between current margin $\Delta I$ and 0.3 pu, is produced. The value of current margin $\Delta I$ is generally approximately 0.1 pu, so that the DC current produced generally corresponds to 0.2 pu.

The setting of setter 23 will now be described. As is well known in the art, a converter consumes lag reactive power. Its power factor "$\cos \phi$" is given as:

$$\cos \phi = \{ \cos \alpha + \cos (\alpha + u) \}/2 \qquad (1)$$

where $\alpha$ denotes the control delay angle and u denotes the overlap of control angles obtained at the time of a commutation of the converter. Eq. (1) teaches that the reactive power consumption by the converter increases approximately in proportion to the increase in angle $\alpha$. This increase in reactive power suppresses the AC overvoltage. For this reason, a relatively high value "$\alpha = 80$ degrees" is used as a typical example of the set value of setter 23.

Now, the setting of setter 21 will be considered.

The minimum operating DC current of a power converter ususally corresponds to 0.1 pu. Assume that switch 20 and setter 21 are not provided (or switch 20 always selects reference value Idp of the DC current), that an operating DC current obtained before the occurrence of a single-phase open fault corresponds to 0.1 pu (i.e., Idp=0.1 pu). Then, the real DC current reference value of automatic current regulator 8' for inverter 3' is the difference between current margin $\Delta I$ and the DC current reference value, or zero. Under the above assumption (Id=0), stable operation in the power system can no longer be expected.

In view of the above standpoint only, to avoid unstable system operation, current set value E21 of setter 21, which is used in place of value Idp, should be as high as possible. In this case, since high curent set value E21 causes high reactive power consumption in the converter, high current set value E21 is also effective for the purpose of overvoltage suppression.

Actually, however, with the occurrence of a single-phase open fault on the inverter 3' side, high current set value E21 increases the possibility of a commutation failure in the operation of the converter and, further, it induces hunting in the AC power system. In this respect, current set value E21 of setter 21 should not be made so high. In either case, current set value E21 should be determined depending on the type and/or the operating condition of the power system employed.

The operation of the FIG. 2 embodiment will now be described in connection with a case wherein open-circuit detector 14' is operated. When inverter 3' provides signal INV="1" and detector 14' delivers signal E14'="1", both AND output E15' from age 15' and OR output E17 from gate 17 go to logic level "1". In this case, switches 18' and 20 are turned on.

Here, it is assumed that before switch 18' is turned on, inverter 3' is operated with control delay angle α=135 to 155 degrees. Thus, automatic margin angle controller 9' supplies minimum value selector 10' with control voltage E9' corresponding to α=135 to 155 degrees. When switch 18' is turned on in this state, control voltage E22' corresponding to α=110 degrees is fed from setter 22' to selector 10'. Then, control voltage E22' of 60 =110 degrees is selected by selector 10'. (The control delay angle of α=110 degrees corresponds to a control advance angle of β=70 degrees).

When control voltage E22' of α=110 degrees is selected by selector 10', the DC current is transiently set at 0.3 pu. This is effective for the purpose of suppressing the overvoltage and preventing commutation failure. The possibility of commutation failure can be further reduced by setting the DC current to 0.1 pu. However, when a single-phase open fault occurs on rectifier 3 side, the DC current is intermitted and the reactive power consumed by the converter is reduced, which degrades the overvoltage suppression effect. Therefore, it is not desirable to reduce the DC current excessively.

When switch 18 in FIG. 2, for instance, is turned on according to E14="1", control voltage E22 corresponding to α=110 degrees is instantaneously selected. When swtich 18 is turned off, current set value E21 of setter 21 is instantaneously disconnected from the control circuit of FIG. 2. However, when the present invention is actually reduced to practice, the above instantaneous signal switching could cause unfavorable operation. In order to prevent such unfavorable operation, it is preferable to smoothly complete the signal switching. For this purpose, a switch circuit as shown in FIG. 3 may be employed.

In the circuit of FIG. 3, switch 180 functionally corresponds to switch 18 of FIG. 2. Switch 180 is connected between the inverting input and the output of amplifier 26. Resistor 29 and capacitor 32 are connected in parallel to switch 180. The inverting input of amplifier 26 receives set value E34 from setter 34 via resistor 28. When switch 180 is turned off, i.e., when the open-circuit detector 14 is rendered inoperative and E14="0", set value E34 from setter 34 is invertedly amplified via amplifier 26 and then fed in negative polarity to adder 33.

Set value E220 corresponding to α=110 degrees is obtained from setter 220 and is also fed in negative polarity to adder 33. An output from adder 33 is supplied via resistor 30 to the inventing input of amplifier 27. The output of amplifier 27 is fed back via resistor 31 to the inverting input thereof. The output from adder 33 is invertedly amplified by amplifier 27. Then, amplifier 27 output control voltage E27 corresponding to, e.g., α=180 degrees. This α=180 degrees can be optionally changed by the adjustment of setter 34 and/or 220.

Control voltage E27 is input to minimum value selector 10. In this case, since the value (α=180 degrees) of output E27 from amplifier 27 is the maximum, output E27 is not selected by minimum value selector 10 (FIG. 2). When switch 180 is turned on in this state, capacitor 32 is rapidly discharged through switch 180. Then, output E26 of amplifier 26 is instantaneously reduced to zero, while output E27 of amplifier 27 is instantaneously changed to a value corresponding to α=110 degrees. When switch 180 is subsequently turned off, output E27 of amplifier 27 is slowly returned to the value corresponding to α=180 degrees according to the time constant of capacitor 32 and resistor 29. This output E27 may be used in place of value E22 in FIG. 2, without using switch 18.

According to the circuit of FIG. 3, when open-circuit detector 14 is rendered operative so that switch 180 is turned on, α=110 degrees is momentarily selected by selector 10 (FIG. 2). When detector 14 is rendered inoperative so that switch 180 is turned off, α=110 degrees is smoothly disconnected from the FIG. 2 circuit by the circuit operation of FIG. 3., thereby achieving smooth switching over to normal circuit operation.

Similarly, the switching operation of other switches 18', 19 and 19' in FIG. 2 can be performed smoothly, with the use of the switch circuit as shown in FIG. 3.

In the embodiment of FIG. 2, the same current set value (E21) is applied both to rectifier side open-circuit detector 14 and inverter side open-circuit detector 14'. However, it is, of course, possible to independently select optimum set values for the rectifier and inverter, by providing separate plural setters corresponding to setter 21.

As has been described in the foregoing, according to the present invention, it is possible to obtain the advantageous effects of ensuring stable operation of the AC/DC power converter, suppressing AC overvoltage and suppressing the promotion of hunting due to interaction of the rectifier and inverter side control systems.

Incidentally, if a certain voltage remains in 3-phase power lines even with the occurrence of a ground fault, the present invention may be applied to a 3-phase AC system. However, the present invention has great effectiveness in case of a single-phase AC system.

The present invention may be used together with the following patent application, one of whose inventors is the same as the inventor of this invention:

U.S. patent application Ser. No. 714,389 filed on Mar. 21, 1985, "POWER CONVERTER CONTROL APPARATUS AND POWER CONVERTER CONTROL METHOD".

The above U.S. application corresponds to Canadian patent application No. 477,431 filed on Mar. 25, 1985, and also to EPC patent application No. 85103843.0 filed on Mar. 29, 1985. All disclosures of the above patent application are incorporated in the present application.

The present invention should not be limited to the embodiments disclosed herein. Various changes or modifications may be made without departing from the scope of the invention as claimed.

What is claimed is:

1. A control apparatus of an AC/DC power converter whose power converting operation depends on a control angle and which is coupled to a power line of an AC power system, said AC/DC power converter being provided with an automatic current regulator which provides a current control voltage corresponding to said control angle, comprising:

detector means for detecting an open-circuit of the power line of said AC power system, and generating a detection signal which indicates the open-circuit of said power line;

set means, coupled to said detector means, for setting, in accordance with the generation of said detection signal, said control angle at a predetermined value which is used for controlling the power converting operation of said AC system when said open-circuit occurs, comprising,
first control voltage means for providing a first control voltage corresponding to said predetermined value, and
second control votage means for providing a second control voltage corresponding to said predetermined value;
lock means, coupled to said detector means, for locking, in accordance with the generation of said detection signal, a current set value of said automatic current regulator at a given value when said open circuit occurs;
an automatic margin angle controller which provides a margin angle control voltage;
minimum value selector means, coupled to said automatic margin angle controller, said automatic current regulator and said first control voltage means, for selecting the minimum one of said current control voltage, said margin angle control voltage and said first control voltage, and providing a selected control voltage representing the selected minimum one which is used for controlling the power converting operation of said AC system; and
maximum value selector means, coupled to said minimum value selector means and said second control voltage means, for selecting the maximum one of said selected control voltage and said second control voltage, and providing a selected control signal representing the selected maximum one which is used for controlling the power converting operation of said AC system.

2. A control apparatus according to claim 1, wherein said set means further includes:
first gate means, coupled to said first control voltage means and said minimum value selector means and responsive to said detection signal, for feeding said first control voltage to said minimum value selector means only when said detector means generates said detection signal and said AC/DC power converter operates as an inverter.

3. A control apparatus according to claim 2, wherein said lock means includes:
current set means for providing a given current set value; and
switch means, coupled to said current set means and said automatic current regulator, for supplying said given current set value to said automatic current regulator only when said detector means generates said detection signal.

4. A control apparatus according to claim 1, wherein said set means further includes:
second gate means, coupled to said second control voltage means and said maximum value selector means and responsive to said detection signal, for feeding said second control voltage to said maximum value selector means only when said detector means generates said detection signal and said AC/DC power converter operates as a rectifier.

5. A control apparatus according to claim 4, wherein said lock means includes:
current set means for providing a given current set value; and
switch means, coupled to said current set means and said automatic current regulator, for supplying said given current set value to said automatic current regulator only when said detector means generates said detection signal.

6. A control apparatus according to claim 1, wherein said set means is provided with:
first smooth switching means, coupled to said detector means, for generating said first control voltage when said detection signal is generated, and decreasing said first control voltage with a given rate when said detection signal disappears.

7. A control apparatus according to claim 6, wherein said set means is provided with:
second smooth switching means, coupled to said detector means, for generating said second control voltage when said detection signal is generated, and decreasing said second control voltage with a given rate when said detection signal disappears.

8. A control apparatus according to claim 7, wherein said lock means includes:
current set means for providing a given current set value; and
switch means, coupled to said current set means and said automatic current regulator, for supplying said given current set value to said automatic current regulator only when said detector means generates said detection signal.

9. A control apparatus according to claim 6, wherein said lock means includes:
current set means for providing a given current set value; and
switch means, coupled to said current set means and said automatic current regulator, for supplying said given current set value to said automatic current regulator only when said detector means generates said detection signal.

10. A control apparatus according to claim 1, wherein said set means is provided with:
second smooth switching means, coupled to said detector means, for generating said second control voltage when said detection signal is generated, and decreasing said second control voltage with a given rate when said detection signal disappears.

11. A control apparatus according to claim 10, wherein said lock means includes:
current set means for providing a given current set value; and
switch means, coupled to said current set means and said automatic current regulator, for supplying said given current set value to said automatic current regulator only when said detector means generates said detection signal.

12. A control apparatus according to claim 1, wherein said lock means includes:
current set means for providing a given current set value; and
switch means, coupled to said current set means and said automatic current regulator, for supplying said given current set value to said automatic current regulator only when said detector means generates said detection signal.

13. A control apparatus of an AC/DC power converter whose power converting operation depends on a control angle and which is coupled to a power line of an AC power system, said AC/DC power converter being provided with an automatic current regulator which provides a current control voltage corresponding to said control angle, comprising:
detector means for detecting an open-circuit of the power line of said AC power system, and generating a detection signal which indicates the open-circuit of said power line;

set means, coupled to said detector means, for setting, in accordance with the generation of said detection signal, said control angle at a predetermined value which is used for controlling the power converting operation of said AC system when said open-circuit occurs; and lock means, coupled to said detector means, for locking, in accordance with the generation of said detection signal, a current value of said automatic current regulator at a given value when said open-circuit occurs;

wherein said lock means includes, current set means for providing a given current set value, and switch means, coupled to said current set means and said automatic current regulator, for supplying said given current set value to said automatic current regulator only when said detector means generates said detection signal.

14. A control apparatus of an AC/DC power converter whose power converting operation depends on a control angle and which is coupled to a power line of an AC power system, said AC/DC power converter being provided with an automatic current regulator which provides a current control voltage corresponding to said control angle, comprising:

detector means for detecting an open-circuit of the power line of said AC power system, and generating a detection signal which indicates the open-circuit of said power line;

set means, coupled to said detector means, for setting, in accordance with the generation of said detection signal, said control angle at a predetermined value which is used for controlling the power converting operation of said AC system when said open-circuit occurs, including first control voltage means for providing a first control voltage corresponding to said predetermined value;

lock means, coupled to said detector means, for locking, in accordance with the generation of said detection signal, a current set value of automatic current regulator at a given value when said open-circuit occurs, wherein said lock means includes, current set means for providing a given current set value, and switch means, coupled to said current set means and said automatic current regulator, for supplying said given current set value to said automatic current regulator only when said detector means generates said detection signal;

an automatic margin angle controller which provides a margin angle control voltage; and minimum value selector means, coupled to said automatic margin angle controller, said automatic current regulator and said first control voltage means, for selecting the minimum one of said current control voltage, said margin angle control voltage and said first control voltage, and providing a selected control voltage representing the selected minimum one which is used for controlling the power converting operation of said AC system.

* * * * *